(12) United States Patent
Engelhardt et al.

(10) Patent No.: US 9,316,450 B2
(45) Date of Patent: Apr. 19, 2016

(54) HEAT EXCHANGER AND METHOD FOR MANUFACTURING A HEAT EXCHANGER

(75) Inventors: Martin Engelhardt, Ditzingen (DE); Stefan Hirsch, Stuttgart (DE); Lars Ludwig, Esslingen (DE); Florin Moldovan, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 858 days.

(21) Appl. No.: 13/528,490

(22) Filed: Jun. 20, 2012

(65) Prior Publication Data

US 2013/0014924 A1 Jan. 17, 2013

(30) Foreign Application Priority Data

Jun. 20, 2011 (DE) .......................... 10 2011 077 838

(51) Int. Cl.
| | |
|---|---|
| *H01M 10/613* | (2014.01) |
| *H01M 10/625* | (2014.01) |
| *H01M 10/66* | (2014.01) |
| *F28F 9/02* | (2006.01) |
| *F28F 9/14* | (2006.01) |
| *F28D 1/053* | (2006.01) |
| *F28F 1/00* | (2006.01) |
| *F28F 1/22* | (2006.01) |

(52) U.S. Cl.
CPC .............. *F28F 9/02* (2013.01); *F28D 1/05366* (2013.01); *F28F 1/00* (2013.01); *F28F 1/22* (2013.01); *F28F 9/14* (2013.01); *H01M 10/613* (2015.04); *H01M 10/625* (2015.04); *H01M 10/66* (2015.04); *F28F 2255/16* (2013.01); *Y10T 29/4935* (2015.01)

(58) Field of Classification Search
CPC .................... H01M 10/5004; H01M 10/5016; H01M 10/5093; F28F 9/02; F28F 1/00; F28F 1/22; F28F 9/14; F28F 2255/16; F28D 1/05366; Y10T 29/4935
USPC .......................................... 165/173, 175, 176
See application file for complete search history.

(56) References Cited

U.S. PATENT DOCUMENTS

| | | | |
|---|---|---|---|
| 3,265,126 A * | 8/1966 | Donaldson .................... | 165/140 |
| 3,548,933 A | 12/1970 | Bain | |
| 4,938,284 A * | 7/1990 | Howells ........................ | 165/149 |
| 6,619,557 B1 | 9/2003 | Bonura et al. | |
| 7,017,655 B2 | 3/2006 | Wilson et al. | |
| 7,030,344 B2 * | 4/2006 | Cho et al. ...................... | 219/520 |

(Continued)

FOREIGN PATENT DOCUMENTS

| | | |
|---|---|---|
| DE | 1 809 545 | 8/1969 |
| DE | 103 47 180 A1 | 5/2005 |

(Continued)

*Primary Examiner* — Tho V Duong
(74) *Attorney, Agent, or Firm* — Muncy, Geissler, Olds & Lowe, P.C.

(57) ABSTRACT

A heat exchanger is provided having a tube block having a plurality of essentially parallel tubes for carrying a temperature control fluid, wherein at least the ends of the tubes are connected to one another. In addition, the heat exchanger comprises at least one header box that is designed to receive a temperature control fluid from the tubes, wherein the at least one header box has an inside height that corresponds within a tolerance range to the height of the ends of the tubes and wherein the header box is placed over the ends of the tubes and is joined thereto in a material-to-material fashion.

7 Claims, 7 Drawing Sheets

(56) References Cited

U.S. PATENT DOCUMENTS

| | | | |
|---|---|---|---|
| 7,032,656 B2 | 4/2006 | Lamich | |
| 7,117,927 B2 * | 10/2006 | Kent | F28F 9/002 165/67 |
| 2001/0037878 A1 * | 11/2001 | Brost et al. | 165/175 |
| 2002/0179291 A1 * | 12/2002 | Abate et al. | 165/153 |
| 2005/0170241 A1 * | 8/2005 | German et al. | 429/120 |
| 2007/0044948 A1 * | 3/2007 | Lu | F28D 1/05375 165/173 |
| 2007/0240863 A1 | 10/2007 | Kim et al. | |
| 2010/0024452 A1 * | 2/2010 | Lifson et al. | 62/154 |
| 2010/0096105 A1 | 4/2010 | Novotny et al. | |
| 2010/0300665 A1 * | 12/2010 | Denoual | 165/164 |
| 2011/0132580 A1 * | 6/2011 | Herrmann et al. | 165/104.33 |

FOREIGN PATENT DOCUMENTS

| | | |
|---|---|---|
| DE | 10 2005 040 611 A1 | 3/2007 |
| DE | 10 2006 043 526 A1 | 4/2007 |
| DE | 20 2007 010 970 U1 | 11/2007 |

\* cited by examiner

HEAT EXCHANGER AND METHOD FOR MANUFACTURING A HEAT EXCHANGER

This nonprovisional application claims priority under 35 U.S.C. §119(a) to German Patent Application No. DE 10 2011 077 838.1, which was filed in Germany on Jun. 20, 2011, and which is herein incorporated by reference.

BACKGROUND OF THE INVENTION

1. Field of the Invention

The present invention relates to a heat exchanger and also a method for manufacturing a heat exchanger.

2. Description of the Background Art

Electrical, electronic, and electrochemical components, such as batteries for example, are subject to operating temperature limits, as are nearly all technical objects. Depending on the structural shape and implementation of the components, considerable temperature ranges can be handled in some cases, although this usually entails high costs.

Electrochemical storage media prove to be especially sensitive to thermal stresses; efforts are made to maintain component temperatures within narrow limits in order to guarantee adequate service life and functionality even under adverse environmental conditions. Li-ion battery cells, in particular, can be significantly impaired with regard to their service life at excessively high operating temperatures so that it is preferable to strive for core temperatures that require cooling with a coolant whose temperature is significantly below common ambient temperatures.

To cool components of a vehicle, especially a battery in a motor vehicle, a heat exchanger should be used. In order to facilitate optimal integration into a vehicle, the heat exchanger should have the smallest possible installation space requirement and have a uniform temperature distribution on the cooling surface.

As a general rule, battery cooling plates are primarily built in layered sheet or two-layer designs, where the coolant flows through channel plates in a specific flow field.

In the case of both layered sheet and two-layer designs, mass production can only be accomplished by means of stamping or embossing tools, which in turn are suitable only for specific workpiece sizes. If a different cooler size is to be produced, one must use new stamping or embossing tools for the purpose; there is thus no flexibility in production, and consequently there are no favorable costs for small to intermediate quantities.

In U.S. Pat. No. 6,619,557 B1, a high-efficiency system for the thermoregulation of a room by silent radiant panels, particularly equipped to operate as doors, is disclosed.

SUMMARY OF THE INVENTION

It is therefore an object of the present invention to provide an improved heat exchanger and an improved method for manufacturing a heat exchanger.

The present invention, in an embodiment, provides a heat exchanger with the following features: a tube block having a plurality of essentially parallel tubes for carrying a temperature control fluid, wherein at least the ends of the tubes are connected to one another; and at least one header box that is designed to receive a temperature control fluid from the tubes, wherein the at least one header box has an inside height that corresponds within a tolerance range to the height of the ends of the tubes and wherein the header box is placed over the ends of the tubes and is joined thereto in a material-to-material fashion.

The present invention additionally provides a method for manufacturing a heat exchanger, wherein the method includes: provision of a tube block having a plurality of essentially parallel tubes for carrying a temperature control fluid, wherein at least the ends of the tubes are connected to one another and at least one header box is designed to receive a temperature control fluid from the tubes, wherein the at least one header box has an inside height that corresponds within a tolerance range to the height of the ends of the tubes; and insertion of the ends of the tubes in the header box and material-to-material joining of the ends of the tubes to the header box.

Here, a first size that corresponds to a second size within a tolerance range can be understood to mean a first size that has a deviation of, for example, not more than 20%, more favorably not more than 5%, of the second size.

The present invention is based on the finding that a heat exchanger can be produced very simply in technical terms if the ends of tubes of a tube block are accommodated directly in a header box having an inside height that is equal to the height of the ends of the tubes within a tolerance range. In this way, the provision of bases can be avoided. Instead, the header box can be placed or pushed directly onto the ends of the tubes and soldered or welded thereto, which is to say joined in a material-to-material fashion, which allows not only a saving in material through the elimination of the bases, but also technically simple production of the heat exchangers through the use of standardized components. In particular, the tube block and/or the header boxes can be designed as bulk goods by length, which are cut to size based on the demand and size for the heat exchanger to be produced and are assembled into the heat exchangers.

The present invention thus offers the advantage of an especially economical production of heat exchangers, since on the one hand simple initial components can be used, and on the other hand only a small expenditure of materials is required in order to produce the novel heat exchanger.

It is especially favorable for the at least one header box to be a formed sheet metal part. Such an embodiment of the present invention offers the advantage that, on the one hand, such a header box can be provided by a bending process that is simple to design in technical terms, and on the other hand such a formed sheet metal part can be provided as bulk goods by length that can be cut to size based on the size and shape of the heat exchanger to be produced.

According to another embodiment of the present invention, at least one second header box can be provided for introducing the temperature control fluid into the tubes, wherein the second header box has an inside height that corresponds to the height of the ends of the tubes within a tolerance range, and wherein the second header box is placed over the other ends of the tubes opposite the ends of the tubes and is joined thereto in a material-to-material fashion. Such an embodiment of the present invention offers the advantage that especially economical production of the heat exchanger is possible with the selection of suitably designed header boxes on both sides of the tube block.

According to another embodiment of the present invention, in order to achieve a defined closure at one side of the tube block while at the same time ensuring a lateral seal of the at least one header box it is possible to provide at least one side part having a height that corresponds essentially to a height of the tubes, wherein the at least one side part is located at one side of the tube block and is arranged parallel to and/or in the plane of the tubes, extends beyond the ends of the tubes, and is joined in a material-to-material fashion to the at least one header box in such a manner that the at least one side part forms a lateral seal of the header box. In this design, the end of the side part that forms the lateral seal of the header box can have essentially the height of the interior of the header box, so that the header box can very easily be placed or pushed over this end of the side part, thus simplifying the production of the heat exchanger.

According to another embodiment of the present invention, a cooling plate can be provided on one side of the tube block in order to permit flexible cooling of the temperature control fluid that will flow in the tubes during operation of the heat exchanger.

The cooling plate can be fastened to the tube block so as to be movable and/or floating. Such an embodiment of the present invention offers the advantage of flexible installation options for the heat exchanger, so that a high heat removal rate can be made possible via the movably supported cooling plate.

In order to allow, e.g., electrical contact to sensors on tubes in the tube block, according to another embodiment of the present invention the cooling plate can have at least one opening, and/or the tube block can have at least one opening located opposite the one opening in the cooling plate, wherein the opening in the cooling plate and/or the opening in the tube block is designed to implement a cable pass-through.

An especially simple production of the heat exchanger is then made possible if, in the region of the ends of the tubes, an intermediate space is provided between the tubes of the tube block and a cutout, in which a spacer is located, is provided in the cooling plate, wherein the spacer has a thickness in the region between the tubes that corresponds essentially to the thickness of the tubes, and wherein the spacer is arranged in the at least one header box in the region of the ends of the tubes and has a thickness that corresponds within a tolerance range to the inside height of the header box. Such an embodiment of the present invention offers the advantage that building in the spacer facilitates assembly of the heat exchanger from the individual components, while at the same time making it possible to ensure the requisite positioning of the individual components in each case before the material-to-material joining.

A very flexible option for setting the temperature of an element, such as a battery, that is to be temperature-controlled by the heat exchanger can be achieved by the means that the heat exchanger also has the option of carrying out heating of the relevant element. According to an especially favorable embodiment of the present invention, a heating element can thus be arranged on one side of the tube block, in particular a side opposite the cooling plate, in particular wherein the heating element has a metal sheet that stands in thermal contact with the tubes and also includes a heater wire designed to heat the metal sheet.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the following description of the preferred exemplary embodiments of the present invention, like or similar reference characters are used for the elements that are shown in the different drawings and have similar functions, with a repeated description of these elements being omitted.

An important aspect of the present invention must be considered to be the manufacture of a compact, simple, and economical heat exchanger in a modular construction, with which a large production range can be covered using a small number of parts and low tool use.

Figure 1:
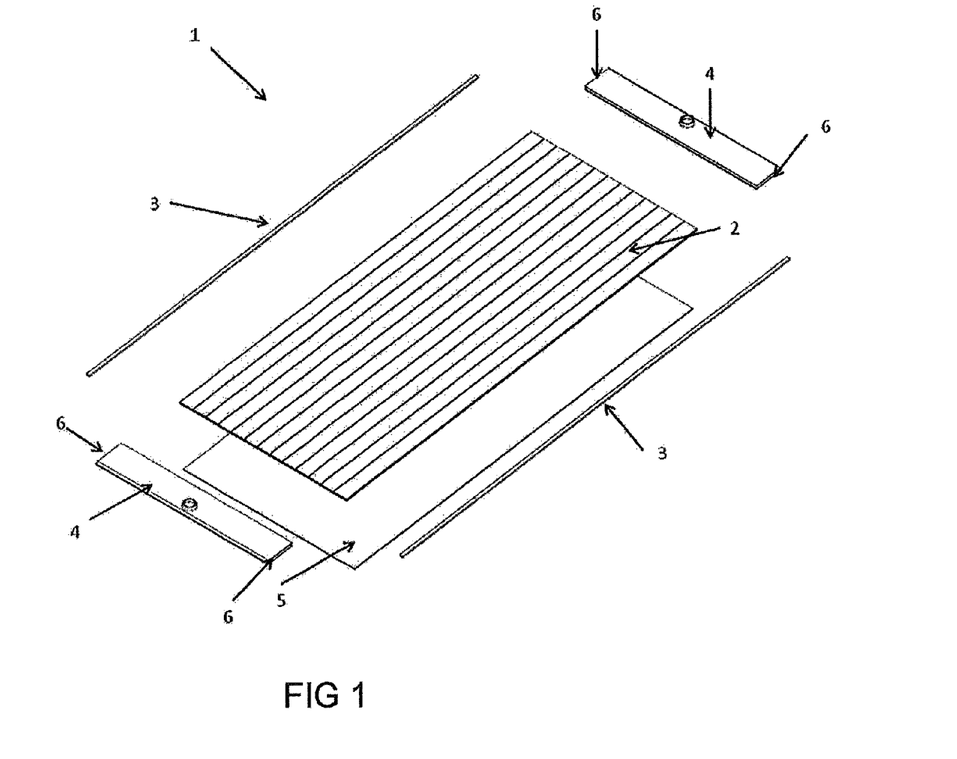
FIG. 1 is an exploded view of an exemplary embodiment of the present invention as a heat exchanger.

FIG. 1 shows an exploded view of an exemplary embodiment of the present invention. In this exemplary embodiment, a heat exchanger 1 in a tube-bundle system is shown, but without bases, which furthermore makes it possible to create a modular, economical design that is as compact as a cooling plate. The heat exchanger of the exemplary embodiment shown in FIG. 1 includes following parts:

Block 2 (or network or tube bundle) of extruded tubes (wherein this tube bundle can also be composed of multi-chambered tubes, for example) and side parts 3 as extruded profiles. Both the bundle of tubes 2 and the side parts should have the same height. Both the bundle of tubes 2 and the side parts 3 are cut to length in a modular fashion in accordance with requirements (for example, cooler length).

Coolant or header boxes 4 (with or without dividing walls, as needed), which can be produced as folded parts at a specific length in a modular fashion in accordance with the application or cooler width. The clear opening of the box 4 should be matched to the height of the tubes 2 and the side parts 3.

Cooler side having one or two cooler plates 5, which can be cut to the cooler length H and cooler width B as sheet metal blanks in accordance with customer preference or application.

Heater side (optional and shown in FIG. 10) having a carrier plate 10 and heater wire 11; in this case the cooler plate can be built in on only the opposite side.

Figure 10:
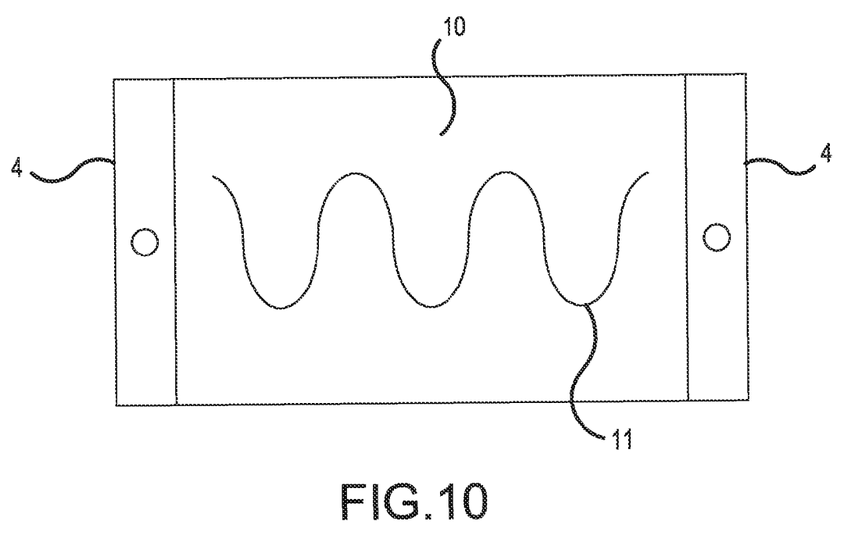
FIG. 10 is a view from below of an exemplary embodiment of the present invention with a view of the heater side.

The heat exchanger 1 is completely soldered, and the heater wire 11 is subsequently installed on the carrier plate 10.

An important aspect according to the exemplary embodiment presented here is that the tubes 2 and the side parts 3 have the same height T, and the clear opening of the box 4 likewise has the same height T, so that the box 4 can be placed or pushed over the ends of the tubes 2 and can be soldered or welded to the tubes 2.

The block 2 could also be produced from a single extruded plate, which would eliminate the cooling plate. However, the disadvantage to be considered in such a solution would be that an extruded plate must be produced for every cooler width (i.e., block width) B. The side plates 3 would nevertheless have to be installed on account of sealing the box in the lateral end regions 6.

The heat exchanger 1 is formed of simple parts that can be adapted rapidly to different installation situations in a flexible manner:

The block 2 has extruded tubes, so that the block length and block width can be configured in a flexible manner through the number of tubes; as a general rule, the extruded tubes are inexpensive to procure.

The side parts 3 are designed as 4-sided extruded profiles (thus are also inexpensive to procure), which are preferably exactly the same height as the tubes; these side parts could, for example, be obtained from the same supplier as the tubes, thereby avoiding all tolerance matching. The side parts 3 need only be cut to a specific length based on the block length. The lengths of the side parts 3 determine the length H of the cooling plate 5. The radii in the cutting tool for producing the side parts 3 should be matched to the folding radii of the box 3. The end regions of the side parts 3 could be cut with the same cutter, and their length is preferably configured in a variable manner by setting the feed.

The coolant boxes 4 here preferably can be designed as folded parts made from sheet metal, so that they very easily can be adapted in length based on block width. The cutting geometry always remains the same in this design. The tool used to cut the boxes 4 to length should be designed such that it can be used to make the longest box 4 that is to be produced.

The heat exchanger 1 can have flow with one or more redirections through the use of dividing walls. The same extruded profiles that are used for the side parts can be used to produce the dividing walls.

Figure 2:
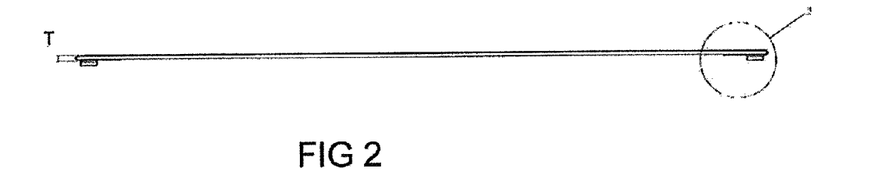
FIG. 2 is a side view of an exemplary embodiment of the present invention.

FIG. 2 shows a side view of an exemplary embodiment of the present invention from the cooling side. It is evident here that the side parts 3, tubes 2, and boxes 4 have essentially the same height T.

Figure 3A:
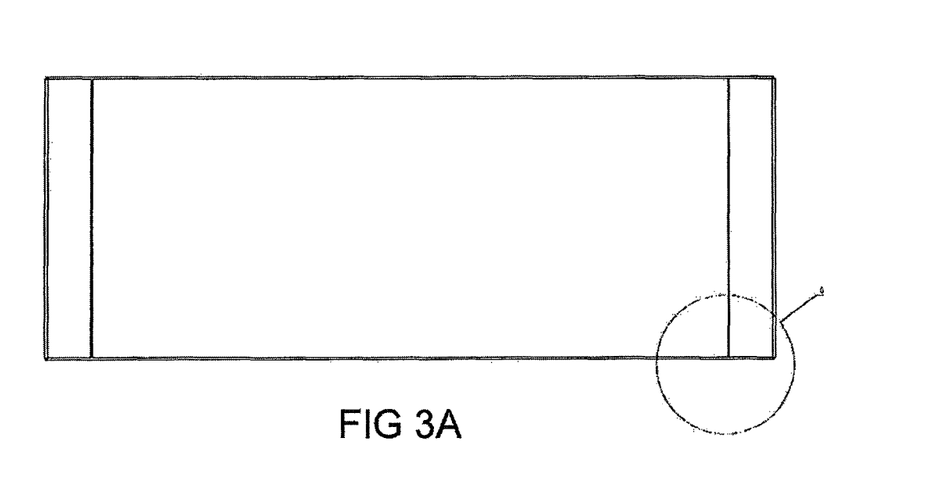
FIG. 3A is a top view of an exemplary embodiment of the present invention with a view of a cooling side.

FIG. 3A shows a perspective view of an exemplary embodiment of the present invention from the cooling side. Primarily evident in this view are the cooling plate 5 and the boxes 4.

Figure 3B:
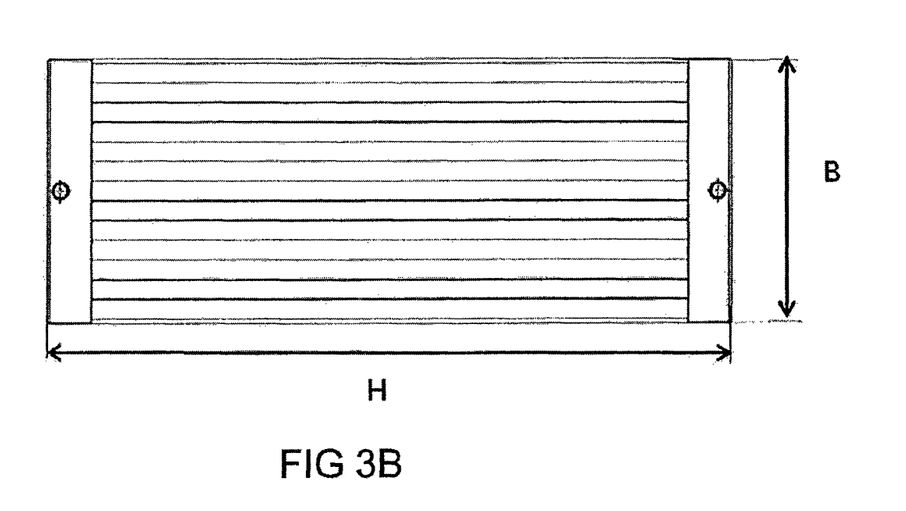
FIG. 3B is a view from below of an exemplary embodiment of the present invention, with the tube block or tube bundle visible.

FIG. 3B shows a view of an exemplary embodiment of the heat exchanger 1 from the side opposite the cooling plate 5. Primarily evident here are the tube block 2 and the header boxes 4, so that a heat exchanger with length H and width B results.

Figure 4A:
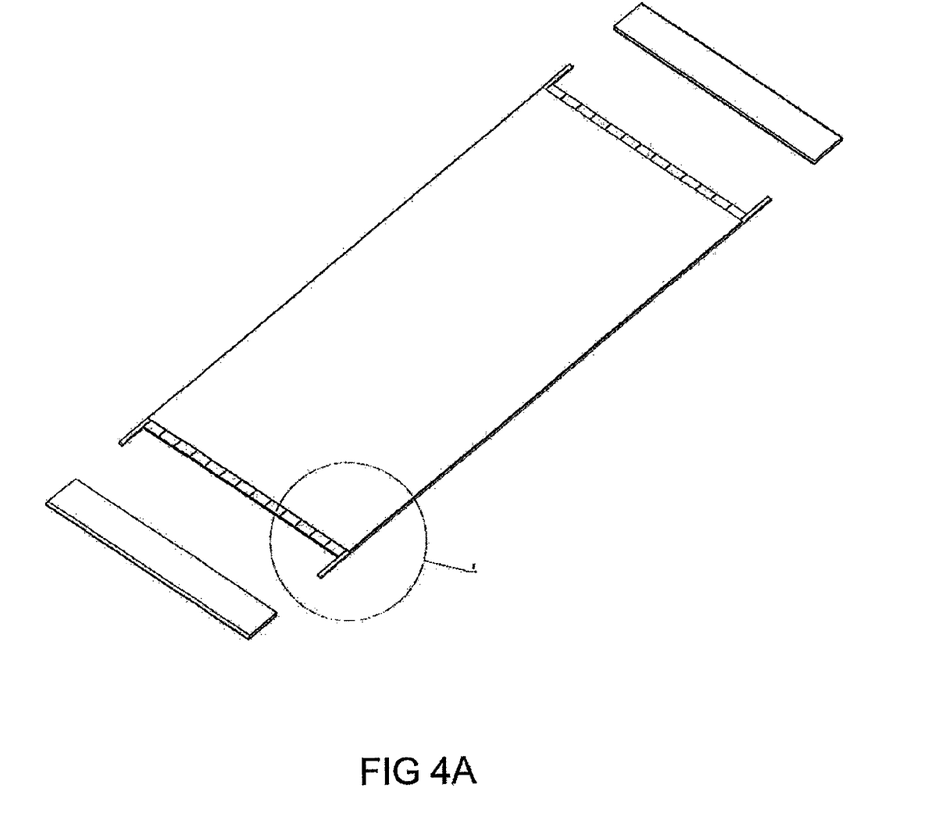
FIG. 4A is a perspective view of an exemplary embodiment of the present invention, wherein a view of the cooling side can be seen.

Visible in FIG. 4A is a perspective view of the cooling side prior to box installation, wherein the cooling side is the side on which the cooling plate is provided. It can be seen in FIG. 4A that the tubes 2 and the side parts 3 are already installed in the final position and are pressed onto the block, wherein the side parts essentially determine the cooler height. The cooling plate rests in a "floating" manner above the tube bundle and side plates.

Figures 4B, 5:
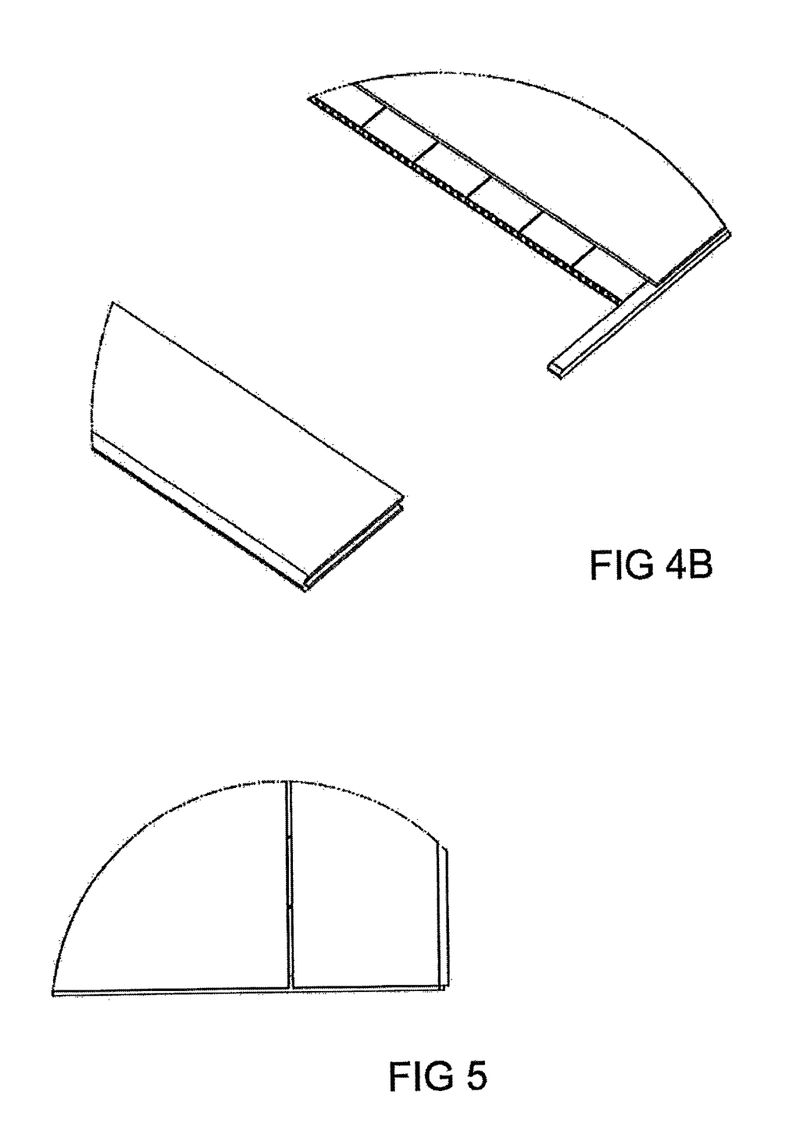
FIG. 4B is an enlarged perspective view of a subsection from FIG. 4A according to an exemplary embodiment of the present invention.
FIG. 5 is a detail view of a subsection of the cooling side according to an exemplary embodiment of the present invention.

FIG. 4B shows an enlarged perspective view of a subsection from FIG. 4A. In FIG. 4B it is evident that the distance from the side parts to the block 2 determines the height of the header 4.

FIG. 5 shows a detail view of the cooling side. It is evident from FIG. 5 that the side part 3 is slightly raised toward the cooling plate 5 and toward the box 3, by which means the tubes 2 are held on the block during soldering. In this regard, the cooling plate 5 rests in a floating manner on the bundle of tubes 2 and the side parts 3 and has a gap toward the end of the box 3, in particular so that the system resulting herefrom is not overdetermined.

Figure 6:
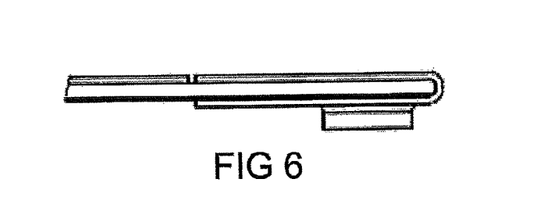
FIG. 6 is a side view in detail according to an exemplary embodiment of the present invention.

FIG. 6 shows a side view of an exemplary embodiment of the heat exchanger 1 in detail. The box is pushed onto the block up to the side part. In this regard, for the simplest possible assembly, a matching of the radii of the box and also of the side parts 3 should take place. The radii of the side part 3 and the bending radii of the box 4 should therefore be matched to one another.

In practice, there are applications in which through holes 8 (in various designs) for fasteners or cable pass-throughs, etc., should be produced in the cooling plate 5 without thereby impairing the function of the plate. This is represented in detail in FIGS. 7A, 7B, 8A, 8B, and 9.

Figures 7A, 8A:
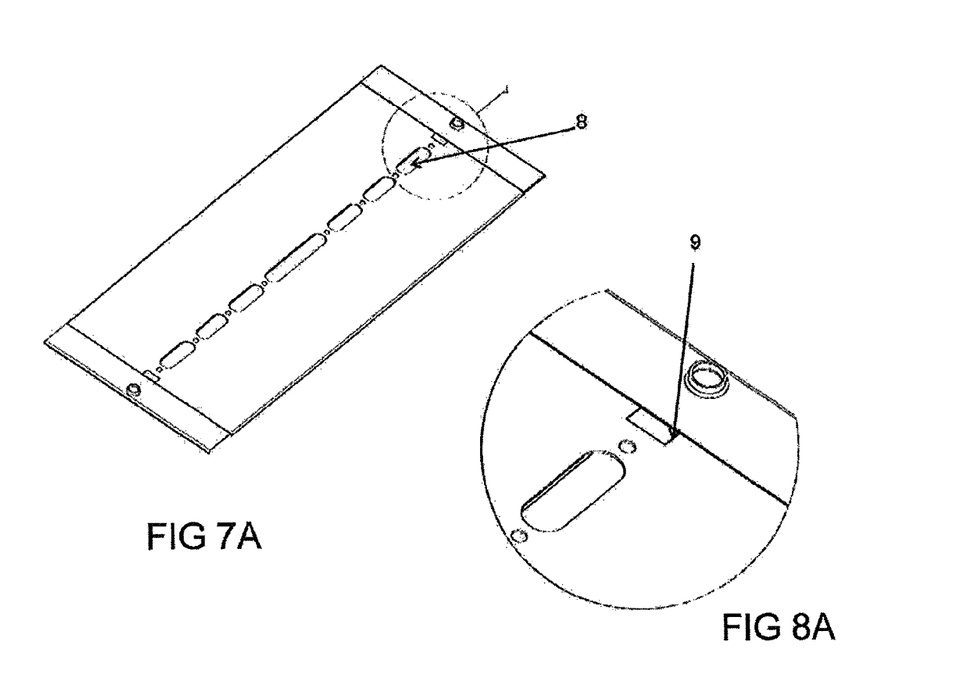
FIG. 7A is a perspective view of an exemplary embodiment of the present invention.
FIG. 8A is a perspective view of an enlarged subsection from FIG. 7A according to an exemplary embodiment of the present invention.
Figures 7B, 8B:
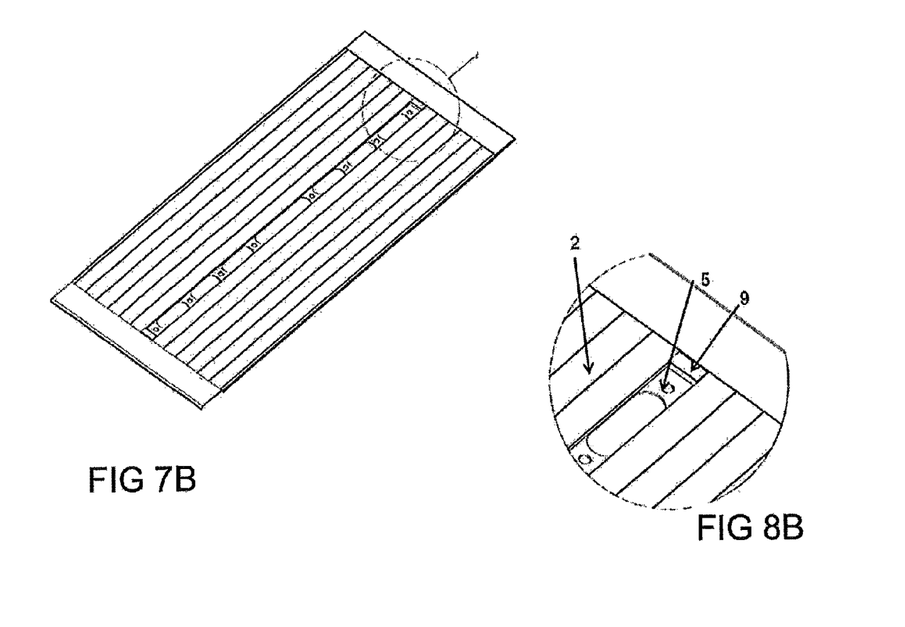
FIG. 7B is another perspective view of an exemplary embodiment of the present invention.
FIG. 8B is a perspective view of an enlarged subsection from FIG. 7B according to an exemplary embodiment of the present invention.

FIG. 7A shows a perspective view of the heat exchanger 1 from the cooling side, wherein the holes 8 or recesses in the cooling plate 5 for fasteners or cable pass-throughs are shown. FIG. 7B shows a perspective view of the heat exchanger 1 from the back, i.e. from the region in which the heater plate can be located. It is evident from FIG. 7A and FIG. 7B that the tube block 2 should be interrupted in the region of the cooling plate 5 in which the holes 8 or recesses are provided. There are two options for this type of heat exchanger 1 for this purpose. On the one hand, "blind tubes" can be used as extruded profiles. These need only be matched in length to the existing tubes 2. Naturally, they should have the same height as the tubes 2, but the width can be configured as desired. It should be noted as a disadvantage here that these blind tubes cause unnecessary weight, and moreover the entire hole pattern both in the cooling plate and in the "blind tube" should be identical, which requires a painstaking tolerance matching and consequently is very expensive. On the other hand, it is possible to use spacers 9 between the tubes 2 that are soldered along with them in the region of the box 4.

Figure 9:
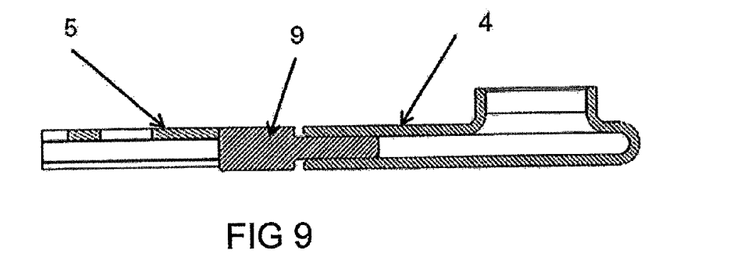
FIG. 9 a is cross-sectional view through a subsection of an exemplary embodiment of the present invention.

These spacers 9 are evident in FIGS. 8A and 8B, wherein FIG. 8 shows a perspective view of the heat exchanger 1 from the cooling side, and FIG. 8B shows a perspective view of the heat exchanger 1 from the back. Here too, extruded profiles should be used for the spacers, for example in a T shape, as can be seen in FIG. 9. In this context, FIG. 9 shows a cross-section through the spacer 9 built into the heat exchanger together with the adjacent components, wherein it is evident that the spacer 9 is installed in one of the recesses 8 in the cooling plate 5 shown in FIG. 7A. Here, a small width 9.1 of the spacer 9 is designed for the clear opening in the box, while a larger width 9.2 should be matched to the height of the tubes 2. The length of the T profiles of the spacer 9 is cut as desired based on the application. It should be noted as advantages here that a saving in weight is achieved and that the hole pattern need only be produced in the cooling plate 5 and in the carrier for the heater. For this reason, no tolerance matching is required.

The exemplary embodiments described are chosen solely by way of example, and can be combined with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat exchanger comprising:
    a tube block having a plurality of substantially parallel tubes for carrying a temperature control fluid, wherein at least ends of the tubes are connectable to one another; and
    at least one header box configured to receive a temperature control fluid from the tubes, the at least one header box having an inside height that corresponds within a tolerance range to the height of the ends of the tubes and the header box being placed over the ends of the tubes and is joined thereto in a material-to-material fashion,
    wherein a cooling plate is provided on one side of the tube block,
    wherein, in a region of the ends of the tubes, an intermediate space is provided between the tubes of the tube block and a cutout in which a spacer is located is provided in the cooling plate,
    wherein the spacer has a thickness in the region between the tubes that corresponds substantially to the thickness of the tubes, and
    wherein the spacer is arranged in the region of the ends of the tubes in the at least one header box and has a thickness that corresponds within a tolerance range to the inside height of the header box.

2. The heat exchanger according to claim 1, wherein the at least one header box is a formed sheet metal part.

3. The heat exchanger according to claim 1, wherein at least one second header box is provided for introducing the temperature control fluid into the tubes, wherein the second header box has an inside height that corresponds to the height of the ends of the tubes within a tolerance range, and wherein the second header box is placed over the other ends of the tubes opposite the ends of the tubes and is joined thereto in a material-to-material fashion.

4. The heat exchanger according to claim 1, wherein at least one side part is provided that has a height that corresponds substantially to a height of the tubes, wherein the at least one side part is arranged at one side of the tube block and is arranged parallel to and/or in a plane of the tubes and extends beyond the ends of the tubes and is joined in a material-to-material fashion to the at least one header box such that the at least one side part forms a lateral seal of the header box.

5. The heat exchanger according to claim 1, wherein the cooling plate is fastened to the tube block.

6. The heat exchanger according to claim 1, wherein the cooling plate has at least one opening and/or the tube block has at least one opening located opposite the one opening in the cooling plate, wherein the opening in the cooling plate and/or the opening in the tube block is configured to implement a cable pass-through.

7. The heat exchanger according to claim 1, wherein a heating element is arranged on a side of the tube block that is opposite the cooling plate, wherein the heating element has a metal sheet that stands in thermal contact with the tubes and also includes a heater wire designed to heat the metal sheet.

\* \* \* \* \*